US006961520B2

(12) United States Patent
Grau et al.

(10) Patent No.: US 6,961,520 B2
(45) Date of Patent: Nov. 1, 2005

(54) METHOD FOR MEASUREMENT OF OPTICAL OR ELECTRICAL SIGNAL SEQUENCES AND EYE DIAGRAM MONITOR FOR MEASUREMENT AND DISPLAY OF SIGNAL SEQUENCES

(75) Inventors: Gunther Grau, Dorsten (DE); Johann Christoph Scheytt, Reken (DE)

(73) Assignee: Advico Microelectronics GmbH, Recklinghausen (DE)

( * ) Notice: Subject to any disclaimer, the term of this patent is extended or adjusted under 35 U.S.C. 154(b) by 141 days.

(21) Appl. No.: 10/657,445

(22) Filed: Sep. 8, 2003

(65) Prior Publication Data

US 2004/0091261 A1 May 13, 2004

(30) Foreign Application Priority Data

Sep. 9, 2002 (DE) ................................. 102 41 848

(51) Int. Cl.[7] ........................ G04B 10/08; G06F 19/00
(52) U.S. Cl. ........................................ 398/33; 702/66
(58) Field of Search ............................ 359/5, 174–177; 398/33; 702/66

(56) References Cited

U.S. PATENT DOCUMENTS 6,433,899 B1    8/2002   Anslow et al.

2002/0060820 A1 *  5/2002  Buchali ...................... 359/109
2003/0101015 A1 *  5/2003  Douskey et al. ............ 702/120

FOREIGN PATENT DOCUMENTS

| DE | 195 04 896 A1 | 8/1996 |
| DE | 199 14 793 A1 | 10/2000 |
| EP | 1 143 654 A2 | 10/2001 |

* cited by examiner

Primary Examiner—John D. Lee
Assistant Examiner—James D. Stein
(74) Attorney, Agent, or Firm—Rankin, Hill, Porter & Clark LLP

(57) ABSTRACT

The present invention relates to a method for measurement of optical rsp. electrical signal sequences and an eye diagram monitor for measurement and display of signal sequences with at least one threshold decision circuit 3, at least one storage device 4, and an analysis device 5.

With the eye diagram monitor in accordance with the present invention the generation of an eye diagram 1 is possible even at very high transmission data rates which is accomplished by at least one counter 6, a signal sequence S fed to an input 7 of the threshold decision circuit 3, an adjustable threshold value SW fed to the other input 8 of the threshold decision circuit 3, and the output 9 of the threshold decision circuit 3 connected with the input 10 of counter 6.

15 Claims, 2 Drawing Sheets

METHOD FOR MEASUREMENT OF OPTICAL OR ELECTRICAL SIGNAL SEQUENCES AND EYE DIAGRAM MONITOR FOR MEASUREMENT AND DISPLAY OF SIGNAL SEQUENCES

BACKGROUND OF THE INVENTION

The present invention relates to a method for measurement of optical or electrical signal sequences in an optical or electrical transmission system wherein a multitude of consecutive signals are periodically sampled at a specific sampling time with one or more adjustable threshold values. In addition the present invention relates to an eye diagram monitor for generation of an eye diagram representation of a signal sequence with at least one threshold decision circuit, at least one storage device, and an analysis device.

In communication systems signals rsp. signal sequences are transmitted via optical or electrical transmission links. Accordingly transmission links are qualified as optical or electrical links. Both types of links have in common that on its way from transmitter to receiver the signal sequence is degraded by different effects, in particular attenuated and distorted, so that the signal at the receiver differs from the signal at the transmitter. In order to avoid errors in the transmission of signal sequences it is necessary to process the received signal in such a way that in the receiver the correct signal sequence is identified.

Since several years optical fibers have been increasingly utilized for signal transmission at high data rates over long distances. Besides attenuation, noise and other effects, dispersion limits the maximum data rate and maximum transmission distance of an optical link. With increasing data rates and transmission distances signals are stronger distorted, so that appropriate signal processing is required in order to recover the original signal sequence from the received signal and to avoid errors during transmission.

Compensation of distortion especially caused by dispersion can be achieved in the optical domain as well as in the electrical domain, e.g. by pre-distortion of the signal in the transmitter and post-processing of the signal in the receiver. At low data rates this can be done statically, e.g. by cascading different types of optical fiber with different dispersion coefficients or by means of dispersion compensated fiber or by one-time adjustment of electrical or optical filters. At high data rates static compensation is not sufficient because dispersion effects can be time-variant. Especially temperature, pressure, and torsion changes rsp. vibrations can result in time-variant dispersion so that dynamic dispersion compensation is required.

Through dispersion effects, such as e.g. polarisation mode dispersion or chromatic dispersion, distortion of the signal occurs which is caused by overlapping signal components with different polarisation modes or wavelengths. The different signal components propagate with different velocities in the optical fiber so that the signals arrive with diffuse timing at the receiver. In order to separate different signals at the receiver which are superposed caused by dispersion effects dynamic equalization is required wherein optical or electronic filters are adjusted dynamically.

For dynamic filter adjustment a decision is required whether the adjustment yielded a signal quality improvement or degradation. This can be achieved by means of a comparison between target data and actual data which can be obtained e.g. by means of error correction at the receiver.

In the beginning it has been stated that the invention pertains to a method for measurement of optical or electrical signal sequences. Whether one refers to a signal sequence as being electrical or optical depends on where the signal sequence is looked at in the system. Usually in the transmitter a signal sequence is electrically generated which is then converted into an optical signal and fed into the optical link, i.e. optical fiber. For recovery of the distorted and attenuated signal sequence which has been transmitted the optical signal is converted into an electrical signal.

Afterwards, data recovery is usually done by means of a clock and data recovery device (clock and data recovery module, CDR) which samples the signal sequence at an "optimum" time and stores the sampling result in a digital memory cell until its next sampling point. As a result, a data signal virtually without time and amplitude noise is available. For the identification of the optimum sampling point two clock and data recovery devices can be operated at different sampling points wherein the better signal can be used for data recovery and the sampling point of the other clock and data recovery is varied to find the optimum sampling point. However, this technique is applicable only if the signal is of sufficient quality so that it is ensured that the chosen sampling point is near the optimum sampling point. If distortion of the received signal is too high an assessment of the signal quality is necessary beforehand.

According to the state of the art direct measurement of signal quality of optical transmission systems is often done by measuring the eye diagram. The eye diagram is a very good means to identify errors of certain components of a transmission system and to make a quality assessment of the performance of the system. The eye diagram is constructed by overlay of similar signal sequences on the screen of an oscilloscope.

According to the state of the art for fast signal measurement usually an analog sample-and-hold circuit is used which is followed by an analog-to-digital converter. With this measurement an eye diagram representation can be constructed similar to the oscilloscope. The sample-and-hold circuit is required because the analog-to-digital converter is in the order of magnitudes slower than the signal which is to be measured and requires a constant input signal. The sample-and-hold circuit consists of a storage element, usually a capacitor, and an electrical switch which is closed for an extremely short time interval so that the storage element is set to the value of the currently measured signal.

With increasing transmission rate the use of a sample-and-hold circuit becomes challenging with the time-window for the acquisition of the sampling value shortening and a maximum limit for the charge current the capacitance of the storage capacitor has to decrease. At data rates of up to 10 Gb/s and more, especially at a data rate of 40 Gb/s, the storage capacitor would require a capacitance which is lower than the parasitic capacitances of an integrated transistor, so that noise, leakage currents, and crosstalk would strongly degrade the accuracy of the measurement or make it impossible.

It is one object of the present invention to provide a method for measurement of optical or electrical signals of an optical transmission system by which signal quality can be measured even at very high data rates and an eye diagram representation of the signal sequence can be generated.

It is a further object of the present invention to provide an eye diagram monitor which can be realized at data rates of several Gb/s in a very simple manner, i.e. with few devices.

BRIEF SUMMARY OF THE INVENTION

The above object can be achieved by a method as described above wherein the probability that the value of the signal sequence at a sampling time is above or below each threshold value is measured, after a given period of time the threshold value is changed and the probability that a value of the signal sequence at a sampling time is above or below a new threshold value is measured and the probability of the preceding threshold value is subtracted from the probability of the current threshold value.

In accordance with the method according to the present invention the statistical properties of the measured signal sequence are analyzed. The signal sequence usually consists of a sequence of electrical signals, i.e. voltages which represent the digital values "1" and "0" of the transmitted data signal. Since the maximum number of consecutive identical bits, i.e. sequences of "1"s only or "0"s only, is limited by coding mechanisms, the eye diagram has always the same shape.

The probability that a value of the signal sequence at a sampling point is above a certain threshold value is equal to the ratio of the number of samples of the signal sequence which are above a certain threshold and the total number of samples. E.g. for a given signal sequence of which the minimum value is greater than zero, the probability that a value of the signal sequence at a sampling point is greater than the threshold value zero is 100%. Accordingly for a signal sequence with a maximum value below 1 the probability that a value of the signal sequence at a sampling point greater than 1 is 0%.

In accordance with the present invention the probabilities that a signal sequence has a value which is in a threshold interval, i.e. between two threshold values, are measured. The different threshold intervals are each defined by two consecutive threshold values. Thus, according to the present invention the probability distribution for different amplitudes of the signal sequence at the sampling point is obtained. E.g. if the first threshold value is 0 and the second threshold value 0.1 the probability that values of the signal sequence are between 0 and 0.1 is obtained. In a further step the new threshold value would be set to 0.2 and hence the probability that values of the signal sequence are between 0.1 and 0.2 is measured. If the threshold values are increased step by step the probability of the threshold value being between two thresholds can be calculated from the difference of the probability of the former threshold value and the probability of the current threshold value.

According to a preferred embodiment of the present invention the sampling time at which the signal sequence is repeatedly sampled with a threshold value is changed after a fixed or adjustable period of time.

According to a first alternative of this preferred embodiment initially the probabilities of all threshold values at one sampling time are measured and subsequently the probabilities of all threshold values for a new sampling time. In a second alternative of this embodiment initially the probabilities for the first threshold value at all sampling times are measured and afterwards for a new threshold value the probabilities at all sampling times are obtained.

With both alternatives the probability distribution of the amplitude of signal sequence can be obtained not only for a certain sampling time but also for an arbitrary period of time. If the method according to this invention is applied to at least 1 complete period of the signal sequence the eye diagram of the transmitted signal can be reconstructed completely. With the first alternative the eye diagram is constructed from different consecutive vertical sections and with the second alternative it is constructed from horizontal sections.

In accordance to the present invention the method can be realized without any sample-and-hold circuit or analog-to-digital converter, so that the disadvantages of these devices which have been described above are omitted and the measurement of eye diagrams is greatly simplified at data rates of 10 Gb/s and above.

The present invention can be realized particularly simple if the values of the signal sequence are fed to a threshold decision circuit, the results from the threshold decision circuit are counted by an event counter and the results of the counter are stored in a memory. If it is important to conduct the measurement fast the values of the signal sequence can be fed simultaneously to several decision circuits with different thresholds so that the interval between the highest and lowest expected value is subdivided in different intervals according to the number of threshold decision circuits.

According to the present invention the first threshold value can be set to a value higher than the highest expected signal level or lower than the lowest expected signal value. In both cases this initial measurement can also be used for control because in the first case the probability that a signal value is higher than the threshold value is 0% and in the latter case the probability that a signal value is higher than the threshold value is 100%. After a certain number of measurements or a certain period of time the threshold value is in the first case decreased rsp. in the latter case increased. This is done repeatedly until in the first case the threshold value is smaller than the smallest expected value rsp. in the second case the threshold value is above the highest expected value.

Furthermore, the above object can be achieved by an eye diagram monitor for generation of an eye diagram representation of signal sequence as described above wherein at least one counter is provided, the signal sequence is fed to an input of the threshold decision circuit, and the output of the threshold decision circuit is connected to the input of the counter.

Thus the eye diagram monitor in accordance with the present invention is characterized by the fact that no sample-and-hold circuit or analog-to-digital converter is required.

As a threshold decision circuit and/or counter a simple flip-flop can be used. The eye diagram monitor according to this invention does therefore not require measurement of the signal amplitude but simply compares the values of the signal sequence by means of a decision circuit with a threshold and the result is counted by means of a counter. The threshold decision circuit can also be connected with an adjustable phase shifter.

Furthermore the method according to the present invention rsp. the eye diagram monitor according to the present invention have the advantage that assessment of the quality of the transmission path and a compensation of distortion are possible even if the transmission data rate is not or not exactly known. It is therefore not required that the sampling rate is synchronous with the transmission data rate. In fact an asynchronous measurement is also possible because in each case a probability distribution can be measured, i.e. an amplitude histogram can be obtained. By means of the asynchronously measured probability distribution the quality of the eye diagram and thus the quality of the transmission path can be estimated. In addition, with an asynchronous measurement the transmission rate can be identified by measuring—as described above—a vertical section of the eye diagram which yields a periodic amplitude histogram from which the period of the signal sequence can be estimated if the sampling rate is known.

DETAILED DESCRIPTION OF A PREFERRED EMBODIMENT

In detail there is a multitude of possibilities to embody or enhance the method according to this invention rsp. the eye diagram monitor for generation of an eye diagram according to this invention. In this respect we refer on the one hand to those patent claims which are dependent on claims 1 and 10 and on the other hand to the description of a preferred embodiment in conjunction with the drawing.

Figure 1:
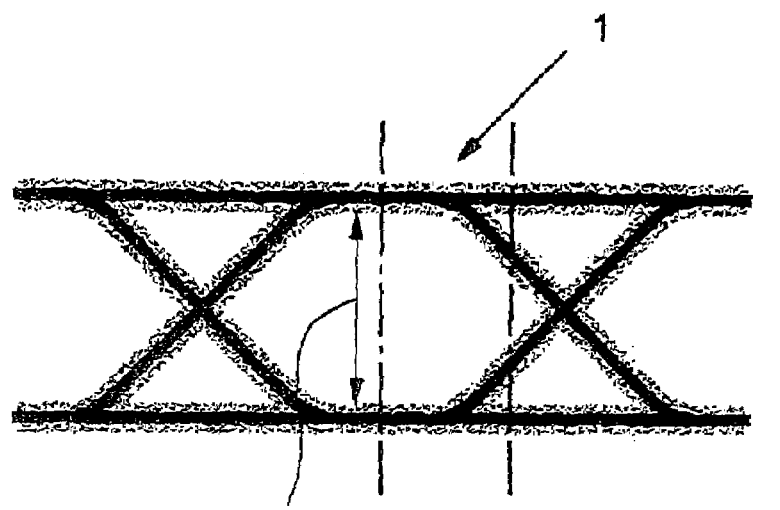
FIG. 1 shows an eye diagram of a signal sequence S.

FIG. 1 shows an eye diagram 1 of a signal sequence S which is to be measured and obtained by means of the method rsp. the eye diagram monitor according to the present invention. An eye diagram 1 is the overlayed representation of all bits of a signal sequence wherein all bits representing a logical "1" are displayed as positive square pulses with smoothed edges and all bits representing a logical "0" are displayed as a negative square pulse with smoothed edges. By overlaying of bits a signal representation is obtained which reminds of the shape of an eye. Through the overlay of a multitude of bits and signal overshoot the eye diagram representation is blurred.

On the basis of eye diagram 1 the expert can assess the quality of the transmission system rsp. the received signal sequence S. Signal degeneration in the transmission path, e.g. distortion of the signal sequence S through dispersion effects, leads for eye diagram 1 to a "closing" of the eye. Since the vertical opening H equals the distance between those bits that represent logical "1"s and those bits that represent logical "0"s, measurement of the vertical eye opening H can be used for optimisation of the transmission path. The lower H is the more difficult it is to distinguish between the two states "1" and "0" of the signal sequence.

In accordance to the present invention the eye diagram 1 from FIG. 1 is obtained by measuring the probability distribution 2 of signal sequence S at sampling time $T_1$. For this purpose the probability $W(SW_1)$ that the value of signal sequence is above or below the respective threshold value $SW_1$ is measured. After a given period of time $t_s$ which defines the length of the sampling period the threshold $SW_1$ is changed and the probability $W(SW_2)$ that the value of signal sequence is above or below the threshold value $SW_2$ is measured. Afterwards the probability value $W(SW_1)$ of the first threshold $SW_2$ is subtracted from the probability $w(SW_2)$ of the second threshold $SW_2$. Thereby the probability $W(DW)$ that a value of the signal sequence at the sampling time $T_1$ is between $SW_2$ and $SW_1$ is calculated.

If the first value $SW_1$ is chosen in such a way that it is above the maximum expected value of the signal sequence the above described method is repeated until the threshold $SW_n$ has reached a value which is below the minimum expected value of signal sequence S. Accordingly if the first value $SW_n$ is chosen in such a way that it is below the minimum expected value of the signal sequence the above described method is repeated until the threshold $SW_n$ has reached a value which is above the maximum expected value of signal sequence S. As a result one obtains the probability distribution 2 at sampling time $T_1$ which is shown in FIG. 2a.

Figure 2A:
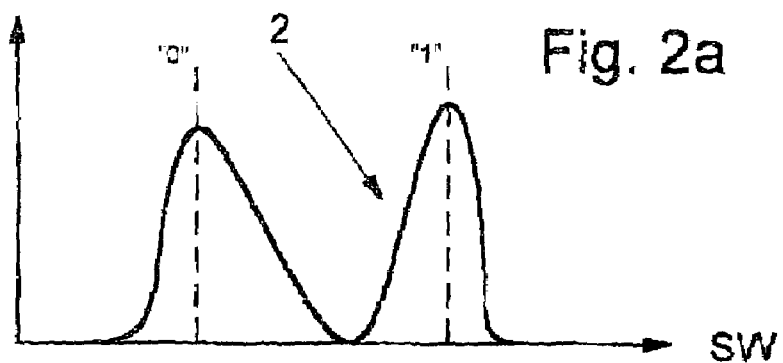
FIG. 2 shows the probability distribution of signal sequence S at a first sampling point $T_1$, and to a second sampling point $T_2$.
Figure 2B:
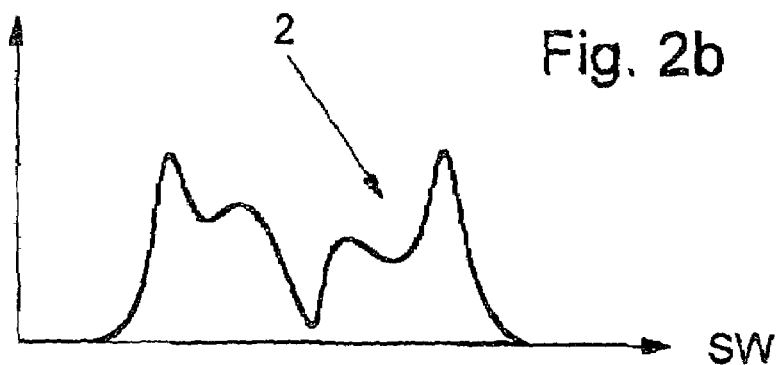

FIGS. 2a and 2b show the probability distributions 2 at two different sampling times $T_1$ and $T_2$. The horizontal axis denotes the different thresholds SW whereas the vertical axis denotes the probability W(SW) that a sampled value occurs which is above threshold SW. It can be seen at the probability distribution 2 according to FIG. 2a that the probability distribution 2 has two pronounced maxima when sampling time $T_1$ is approximately in the center of the eye diagram. Both maxima correspond to the logical values "1" and "0". If $T_1$ is clearly outside the center then the probability distribution 2 according to FIG. 2b has more than two maxima. A well-defined assignment which maximum represents the logical "1" and the logical "0" is not possible any more.

If the probability distribution 2 is measured solely at one sampling time $T_1$ the vertical eye opening only for this sampling time can be obtained. Since the quality of transmission can only be assessed based on the vertical eye opening if the sampling point is chosen "right", i.e. the sampling occurs in the center of the eye, measurement of transmission quality based on 1 sampling time and the vertical eye opening is of limited use.

Therefore the method in accordance with the invention has to be applied not only for one sampling time $T_1$ but also for a multitude of sampling times $T_n$ so that by means of calculation of all probability distributions 2 a reconstruction of the complete eye diagram 1 is possible. The resolution of eye diagram 1 can be adjusted by choosing the sampling times $T_n$ and the period of time $t_s$ in which sampling is performed.

Figure 3:
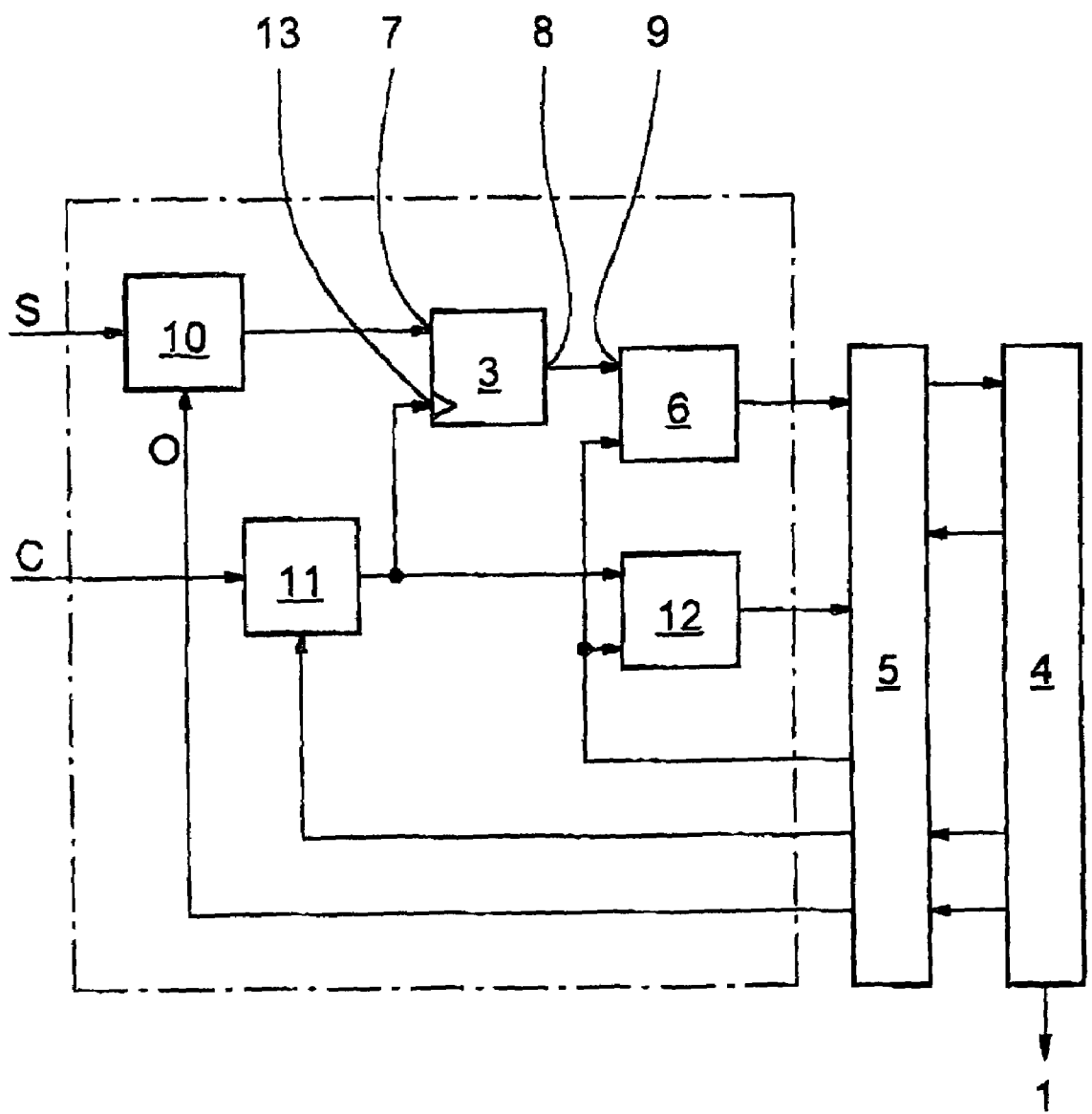
FIG. 3 shows a block diagram of the eye diagram monitor for generation of eye diagram of a signal sequence S.

FIG. 3 shows a block diagram of an eye diagram monitor in accordance to the present invention which allows to generate the eye diagram 1 by means of the method described above. The eye diagram monitor has a threshold decision element 3, a storage element 4, and an analysis element 5.

In accordance with the present invention the eye diagram monitor is realized particularly simple but is nevertheless applicable for signal sequences S with very high data rates if it is constructed so that a counter 6 is provided wherein the counter 6 is arranged between the threshold decision element and the analysis element. The threshold decision element 3 exhibits an input 7 for the signal sequence and an output 8 which is connected with the input 9 of the counter 6.

In addition to that, in the embodiment shown in FIG. 3 there is an adder 10, a phase-shifter 11, and a second counter 12. The adder 10 is arranged at the input 7 of the threshold decision element 3 so that the input 7 of the threshold decision element 3 is not directly connected to the signal sequence S but to the sum of the signal sequence S and the adjustable DC voltage O. By means of the adder 10 in front of the threshold decision element 3 the adjustment of the thresholds SW can be accomplished by variation of the DC voltage O. The adder 10 can e.g. be realized with a series connection of an emitter follower and a resistor with an adjustable current. If the threshold is not changed in the threshold decision element 3 but indirectly by a modification of the DC voltage O which is added to the signal sequence S the threshold decision element 3 may have a fixed threshold. The threshold decision element 3 can then be realized by means of a simple flip-flop.

With the arrangement of the phase shifter 11 between clock signal C and input 13 of the threshold decision element 3 the measurement of the probability distribution 2 of the signal sequence S at different sampling times $T_n$ can be realized. To the input of the phase shifter 11 the clock signal C is fed wherein usually the frequency of the clock signal C is chosen in such a way that the transmission data rate is an integer multiple of the frequency of the clock signal C. At a transmission data rate of e.g. 40 Gb/s the frequency of the clock signal C can be e.g. 1.25 GHz or 2.5 GHz.

The second counter 12 allows to measure the total number of measurement cycles so that the result of the first counter 6 can be put into relation to the result of the second counter 12. Therefore the phase shifter 11 is connected to the input of the second counter 12. Via the second input of the first counter 6 and the second input of the second counter 12 the counters can be reset by the analysis element. Thus also the time period $t_s$ can be adjusted.

While the above description contains many specificities, these should not be construed as limitations on the scope of the invention, but rather as an exemplification of one preferred embodiment thereof. Many other variations are possible.

In detail there is a multitude of applications for the method according to the present invention and the eye diagram monitor according to the present invention. Besides the equalization of signal sequences which was described above the method is also suitable for "Quality of Service" measurements by which the transmission quality of transmission paths are measured or tested. The eye diagram monitor in accordance to this invention can also be used e.g. in portable measurement equipment with which the eye diagram of a signal sequence can be displayed and with which the quality of the transmission path can be assessed.

Accordingly, the scope of the invention should be determined not by the embodiment illustrated, but by the appended claims and their legal equivalents.

What is claimed is:

1. A method for measurement of an optical or electrical signal sequence (S) in an optical or electrical transmission system wherein a multitude of consecutive signals are sampled periodically at a sampling time ($T_1$) with at least one adjustable threshold value (SW), wherein a first probability ($W_1$) that a value of the signal sequence (S) at the sampling time ($T_1$) is above or below a first threshold value ($SW_1$) is measured, after a given period of time ($t_s$) the first threshold value ($SW_1$) is changed and a second probability ($W_2$) that the value of the signal sequence (S) at the sampling time ($T_1$) is above or below a second threshold value ($SW_2$) is measured and the first probability ($W_1$) is subtracted from the second probability ($W_2$).

2. The method of claim 1, wherein a sampling time ($T_x$) at which the consecutive signals are sampled with the at least one adjustable threshold value (SW) is modified after a fixed or adjustable period of time ($t_p$).

3. The method of claim 2, wherein a plurality of probabilities ($W_1$, $W_2$, $W_3$ ...) associated with threshold values ($SW_1$, $SW_2$, $SW_3$ ...) are measured successively at a first sampling time ($T_x$), and wherein, for a second sampling time ($T_x$'s) the plurality of probabilities ($W_1$, $W_2$, $W_3$ ...) associated with threshold values ($SW_1$, $SW_2$, $SW_3$ ...) are measured successively.

4. The method of claim 2, wherein the first probability ($W_1$) of the first threshold value ($SW_1$) is measured successively for a plurality of sampling times ($T_1$, $T_2$, $T_3$ ...), and wherein, for the second threshold value ($SW_2$) the second probability ($W_2$) for the plurality of sampling times ($T_1$, $T_2$, $T_3$ ...) is measured successively.

5. The method of claim 1, wherein for measurement of a plurality of probabilities ($W_1$, $W_2$, $W_3$ ...) the signals are fed to a threshold decision circuit, wherein results of the threshold decision circuit are counted in an event counter, and wherein results of the event counter are fed to a storage device.

6. The method of claim 1, wherein the first threshold value ($SW_1$) is set to a value above a highest expected value of the signal sequence (S).

7. The method of claim 6, wherein a plurality of threshold values ($SW_1$, $SW_2$, $SW_3$ ...) are reduced after each period of time ($t_s$) until a threshold value ($SW_m$) is set to a value below a lowest expected value of the original sequence.

8. The method of claim 1, wherein the first threshold value ($SW_1$) is set to a value below a lowest expected value of the signal sequence (S).

9. The method of claim 8, wherein a plurality of threshold values ($SW_1$, $SW_2$, $SW_3$ ...) are increased after each period of time ($t_s$) until a highest threshold value ($SW_m$) is set to a value above a highest value of the signal sequence (S).

10. An eye diagram monitor for generation of an eye diagram of signal sequence (S) with at least one threshold decision circuit, with at least one storage device, and with an analysis device, said at least one threshold decision circuit being adapted to:
sample a multitude of consecutive signals periodically at a sampling time ($T_1$) with at least one adjustable threshold value (SW);
measure whether a first probability ($W_1$) that a value of the signal sequence (S) at the sampling time ($T_1$) is above or below a first threshold value ($SW_1$);
measure whether, after a given period of time ($t_s$). the first threshold value ($SW_1$) is changed and a second probability ($W_2$) that the value of the signal sequence (S) at the sampling time ($T_1$) is above or below a new threshold value ($SW_2$);
subtract the first probability from the second probability ($W_2$); wherein the eye diagram monitor comprises at least one counter, wherein the signal sequence (S) is fed to an input of the threshold decision circuit, and the output of the threshold decision circuit is connected to the input of the counter.

11. The eye diagram monitor of claim 10, wherein an adder is provided by which a DC voltage (O) is added to the signal sequence (S) and the sum of signal sequence (S) and DC voltage (O) is fed to the input of the threshold decision circuit.

12. The eye diagram monitor of claim 11, wherein for the adder a current-driven emitter-follower with a series resistor or a current mirror is used.

13. The eye diagram monitor of claim 10, wherein the threshold decision circuit and/or the counter is realized by a flip-flop.

14. The eye diagram monitor of claim 10, wherein the threshold decision circuit is connected with an adjustable phase shifter.

15. The eye diagram monitor of claim 10, wherein the at least one threshold decision circuit further comprises:
means for sampling a multitude of consecutive signals periodically at a sampling time ($T_1$) with at least one adjustable threshold value (SW);
means for measuring whether a first probability ($W_1$) that a value of the signal sequence (S) at the sampling time ($T_1$) is above or below a first threshold value ($SW_1$);
means for measuring whether, after a given period of time ($t_s$), the first threshold value ($SW_1$) is changed and a second probability ($W_2$) that the value of the signal sequence (S) at the sampling time ($T_1$) is above or below a new threshold value ($SW_2$);
means for subtracting the first probability from the second probability ($W_2$); wherein the eye diagram monitor comprises at least one counter.

* * * * *